United States Patent [19]

Weidner et al.

[11] Patent Number: 5,302,683
[45] Date of Patent: Apr. 12, 1994

[54] SILICONE RESIN-BASED COATINGS

[75] Inventors: Richard Weidner, Burghausen, Fed. Rep. of Germany; Erich Bildl, Franking, Austria; Volker Frey, Burghausen, Fed. Rep. of Germany; Manfred Meisenberger, Burghausen, Fed. Rep. of Germany; Reinhardt Mueller, Burghausen, Fed. Rep. of Germany

[73] Assignee: Wacker-Chemie GmbH, Munich, Fed. Rep. of Germany

[21] Appl. No.: 51,911

[22] Filed: Apr. 26, 1993

Related U.S. Application Data

[63] Continuation of Ser. No. 862,705, Apr. 3, 1992, abandoned.

[30] Foreign Application Priority Data

May 3, 1991 [DE] Fed. Rep. of Germany ....... 4114517
Aug. 30, 1991 [DE] Fed. Rep. of Germany ....... 4128893

[51] Int. Cl.$^5$ ............................................. C08G 77/08
[52] U.S. Cl. ......................................... 528/21; 528/22; 528/23; 528/10; 528/34; 525/474; 106/287.12; 106/287.13; 106/287.16; 524/413; 524/424; 524/440; 524/441
[58] Field of Search ............... 528/21, 22, 23, 34, 528/10; 525/474; 106/287.12, 287.13, 287.16; 524/413, 424, 440, 441

[56] References Cited

U.S. PATENT DOCUMENTS

| | | | |
|---|---|---|---|
| 2,518,160 | 8/1950 | Mathes | 528/21 |
| 2,906,734 | 9/1959 | Clark | 528/21 |
| 3,503,925 | 3/1970 | Griffin | 260/46.5 |
| 3,642,693 | 2/1972 | Jasinski | 260/46.5 R |
| 3,919,344 | 11/1975 | Merrill et al. | 260/46.5 R |
| 4,413,104 | 11/1983 | Deubzer et al. | 525/479 |
| 4,435,219 | 3/1984 | Greigger | 106/287.16 |
| 4,476,281 | 10/1984 | Vaughn, Jr. | 524/767 |
| 4,605,446 | 8/1986 | Isozaki | 106/287.12 |
| 5,079,324 | 1/1992 | Cocco et al. | 528/14 |

FOREIGN PATENT DOCUMENTS

| | | |
|---|---|---|
| 0157323 | 10/1985 | European Pat. Off. |
| 0263431 | 4/1988 | European Pat. Off. |
| 0367696 | 5/1990 | European Pat. Off. |
| 0382365 | 8/1990 | European Pat. Off. |
| 0382366 | 8/1990 | European Pat. Off. |
| 3628048 | 2/1987 | Fed. Rep. of Germany |

OTHER PUBLICATIONS

Patent Abstracts of Japan, vol. 9, No. 233 (C-304) (1956), Sep. 19, 1985 & JP-A-60 092 351 (Daicel Kagaku Kogyo K.K.) May 23, 1985.
W. Noll, Chemie und Technologie der Silicone, Verlag Chemie GmbH, Weinheim, pp. 485/486.
W. Noll, Chemistry and Technology of Silicones, Academic Press, Inc. 1968, pp. 562-564.

*Primary Examiner*—John C. Bleutge
*Assistant Examiner*—Margaret W. Glass

[57] ABSTRACT

The present invention relates to a process for preparing coating compositions which comprises condensing a mixture containing (A) at least one silicone resin containing Si-bonded alkoxy groups and, if desired, silanol groups and/or at least one silane and/or siloxane which contains Si-bonded alkoxy groups and, if desired, silanol groups to form a silicone resin, (B) a basic condensation catalyst in an amount sufficient to render this mixture basic, (C) optionally water and (D) optionally an organic solvent.

The resultant coating compositions are preferably employed in the form of a solution, emulsion or dispersion.

5 Claims, No Drawings

SILICONE RESIN-BASED COATINGS

This application is a continuation of application Ser. No. 07/862,705, filed Apr. 3, 1992, now abandoned.

The present invention relates to a process for preparing silicone resin-based coating compositions having a long shelf life and their use for coating substrates.

BACKGROUND OF THE INVENTION

U.S. Pat. No. 3,503,925 (P. A. Griffin, published on 31 March 1970 to Midland Silicones Ltd.) describes a process for preparing a cross-linkable organopolysiloxane resin using an organopolysiloxane resin which contains less than 0.25% by weight of silanol groups. This organopolysiloxane resin is mixed with an anhydrous, quaternary ammonium silanolate or phosphonium silanolate as condensation catalyst. Due to the low silanol content of the organopolysiloxane resin, this mixture does not have a tendency to gel and therefore has a long shelf life. Crosslinking of the organopolysiloxane resin is obtained by heating the mixture above 50° C. on the substrate.

U.S. Pat. No. 2,986,549 (J. R. McLoughlin et al., published on 30 May 1961 to General Electric Co.) describes coating compositions based on silicone resins. These resins are prepared, inter alia, by hydrolysis and condensation of phenyltrichlorosilane and dimethyldichlorosilane and are mixed with tetramethylammonium hydroxide as a condensation catalyst and with from two to five mols of acetic acid per mol of tetramethylammonium hydroxide to form a coating composition. The acetic acid serves as stabilizer for storage of the coating composition. The actual coating is formed by heating the coating composition on the substrate, during which the stabilizer softens and curing is facilitated.

Similar coating compositions are described in U.S. Pat. No. 2,986,548 (J. R. McLoughlin et al., published on 30 May 1961 to General Electric Co.). However, the alkaline condensation catalyst employed need not be completely neutralized by means of acid if an α-halogenated carboxylic acid, such as trichloroacetic acid, is added in amounts of at least 0.25 mol per mol of the alkaline condensation catalyst.

Therefore, it is an object of the present invention to provide coating compositions having a long shelf life. Another object of the present invention is to provide binders which physically dry or crosslink in a short period of time, even at room temperature, to form tack-free films. Still another object of the present invention is to provide coatings which may be applied and exposed to high temperatures. A further object of the present invention is to provide coating compositions which may be used to form baked finishes.

SUMMARY OF THE INVENTION

The foregoing objects and others which will become apparent from the following description are accomplished in accordance with this invention generally speaking, by providing a process for preparing coating compositions which comprises condensing a mixture containing (A) at least one silicone resin containing Si-bonded alkoxy groups and, if desired, silanol groups and/or at least one silane and/or siloxane containing Si-bonded alkoxy groups and, if desired, silanol groups to form a silicone resin, (B) a basic condensation catalyst in an amount sufficient to render the resultant mixture basic, (C) optionally, water and (D) optionally an organic solvent, where the initial silanol content is at least 0.3% by weight, based on component (A), or where component (A) contains at least sufficient Si-bonded alkoxy groups, in addition to any silanol groups, so that the silanol content of component (A) achieved through reaction with water at the beginning of the reaction corresponds to at least 0.3% by weight of component (A) and where the coating composition is free from carboxylic acids and salts thereof, with the proviso that, if the mixture contains (D) an organic solvent, the alkanol formed during the reaction is removed.

DESCRIPTION OF THE INVENTION

The term "a basic condensation catalyst in an amount sufficient to render the mixture basic" as used herein, means that the amount of base is not fully neutralized by acid in the preparation of the coating compositions of this invention.

The process of this invention enables the preparation of coating compositions starting from a wide variety of silanes and siloxanes referred to as component (A), in a single process step.

The reaction is carried out in such a manner that a thermodynamic equilibrium is formed in the mixture of the components at the end of the preparation process. The coating compositions obtained by the process of this invention are therefore already stable and do not require any stabilizer which requires deactivating or removal for the production of a coating. In contrast to known processes, the separation of a solid resin or addition of a stabilizer is not necessary in the process of this invention.

The initial content of silanol groups or Si-bonded alkoxy groups and water in the mixture is necessary for the condensation reaction of the components in order to obtain the coating compositions of this invention. During the reaction, silanol groups are formed from alkoxy groups through reaction with water. However, component (A) must be free from Si-bonded halogen atoms capable of condensation since such groups deactivate the basic condensation catalyst.

The mixtures employed in the process of this invention preferably contain from $2 \cdot 10^{-3}$ mol to 0.5 mol, and in particular from $5 \cdot 10^{-3}$ mol to 0.1 mol, of base per kg of component (A).

The mixture is preferably converted, before or after the reaction, to a solution, emulsion or dispersion and employed in this form as a coating composition. Solutions are preferably solutions in organic solvents, and emulsions and dispersions are preferably aqueous emulsions and dispersions. The emulsions can be formed from solid resins dissolved in solvents or from liquid resins.

Component (A) or a part of component (A) in the process of this invention is preferably a silicone resin of the formula $$R_x(OR')_y SiO_{(4-x-y)/2} \tag{1}$$

in which R is the same or different, and represents substituted or unsubstituted $C_1$- to $C_{18}$-hydrocarbon radicals, R' is the same or different, and represents $C_1$- to $C_4$-alkyl radicals or hydrogen atoms and x has an average value of from 1.1 to 1.9 and the sum of $x+y$ has a maximum value of 2.5.

Examples of radicals represented by R are alkyl radicals, such as methyl, ethyl, n-propyl, isopropyl, n-butyl, isobutyl, sec-butyl, tert-butyl, n-pentyl, isopentyl, neopentyl and tertpentyl radicals; hexyl radicals, such as the n-hexyl radical; heptyl radicals, such as the n-heptyl radical; octyl radicals, such as the n-octyl radical, and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals, such as the vinyl and allyl radicals; cycloalkyl radicals, such as the cyclopentyl, cyclohexyl and cycloheptyl radicals, and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and alpha- and β-phenylethyl radicals.

Examples of substituted radicals represented by R are cyanoalkyl radicals, such as the β-cyanoethyl radical, and halogenated hydrocarbon radicals, for example haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radicals; aminoalkyl radicals, such as the 3-aminopropyl radical, the N-(cyclohexyl)-3-aminopropyl radical and the N-(2-aminoethyl)-3-aminopropyl radical; ester-functional radicals, such as the acryloxypropyl and methacryloxypropyl radicals; epoxy-functional radicals, such as the glycidoxypropyl radical, and mercapto-functional radicals, such as the mercaptopropyl radical.

Preferred radicals represented by R are unsubstituted hydrocarbon radicals, and in particular those having 1 to 8 carbon atoms, such as the methyl, ethyl, vinyl, tolyl and phenyl radicals.

Examples of radicals represented by R' are hydrogen atoms and methyl, ethyl, n-propyl, isopropyl, n-butyl, sec-butyl, isobutyl and tert-butyl radicals.

The index x preferably has a value of from 1.1 to 1.8 and in particular from 1.1 to 1.7.

The index y preferably has a value of from 0.1 to 1.8 and in particular from 0.25 to 1.

Component (A) or a part of component (A) employed in the process of this invention is preferably a silane or silane mixture of the formula $$R_a Si(OR')_{(4-a)} \quad (2)$$

in which R and R' are the same as above, and a has an average value of from 1.1 to 1.9.

In particular, component (A) comprises exclusively silicone resins of formula (1) and/or silanes or silane mixtures of formula (2).

The coating compositions prepared in the process of this invention preferably contain from 5 to 90% by weight, and more preferably 30 to 80% by weight, of component (A), based on the total weight of all components, including the solvent and water.

The coating compositions prepared according to this invention, and in particular the solutions, are preferably prepared from component (A) which comprises one or more silicone resins of formula (1) and/or silanes or silane mixtures of formula (2), in which at least 20%, preferably a least 30%, of the radicals R are phenyl radicals and/or tolyl radicals. In particular, at least 20%, and more preferably at least 30%, of the radicals R are phenyl radicals, Examples of bases which can be employed as component (B) are hydroxides, methoxides, ethoxides and isopropoxides, ammonia, amines, alkali metal and alkaline earth metal hydroxides, such as LiOH, NaOH, KOH, RbOH, CsOH, Mg(OH)$_2$, Ca(OH)$_2$, Sr(OH)$_2$ and Ba(OH)$_2$; carbonates and bicarbonates of alkali metals and alkaline earth metals, such as Na$_2$CO$_3$, NaHCO$_3$, K$_2$CO$_3$, KHCO$_3$ and CaCO$_3$; silanolates and siliconates of the alkali metals; ammonium and phosphonium hydroxides or silanolates thereof, and ammonium and phosphonium alkoxides.

Component (B) or part of component (B) in the process of this invention is preferably a basic condensation catalyst which boils, sublimes or decomposes, with loss of its basic properties, at temperatures of up to 600° C. and at a pressure of 0.1 MPa.

Particularly suitable are quaternary ammonium and phosphonium compounds, specifically those of formulas $$R_4NOR' \quad (3)$$

$$R_4POR' \quad (4)$$

in which R and R' are the same as those defined in formulas (1) and (2).

Particularly preferred compounds of formulas (3) and (4) are tetra(C$_1$- to C$_{18}$-hydrocarbon)ammonium hydroxides and tetra(C$_1$- to C$_{18}$-hydrocarbon)phosphonium hydroxides, where the hydrocarbon radicals are, preferably alkyl, aryl, alkaryl and aralkyl radiicals. Especially preferred are tetra(C$_1$- to C$_{12}$-hydrocarbon) ammonium hydroxides and tetra(C$_1$- to C$_{12}$-hydrocarbon)-phosphonium hydroxides and/or silanolates thereof. These silanolates are prepared by reacting the quaternary ammonium and phosphonium hydroxides with organosilanes or organosiloxanes.

A preferred example of a quaternary ammonium compound is benzyltrimethylammonium hydroxide, which decomposes at 130° C. and 0.1 MPa to form benzyl alcohol and gaseous trimethylamine. Another preferred example of such a compound is tetramethylammonium hydroxide.

A preferred example of a phosphonium compound is tetra-n-butyl-phosphonium hydroxide, which decomposes at 150° C. and 0.1 MPa to form tri-n-butylphosphine oxide and butane, it being possible for the latter to escape in gaseous form.

The coating compositions, and in particular solutions, emulsions and dispersions, prepared by the process of this invention may contain pigments. Pigments which can be employed are all pigments which have been or could have been employed heretofore in coating compositions, such as in paints. Examples of such pigments are inorganic pigments, such as CoAl$_2$O$_4$, cobalt silicate, ultramarine, iron oxides, titanium dioxide, silicon carbide, carbon black, metal pigments, and organic pigments.

Preferred pigments are iron oxides, carbon black and metal pigments, and in particular aluminum and zinc.

The coating compositions preferably contain pigments, in amounts of from 1 to 1000% by weight, and more preferably from 20 to 500% by weight, based on the weight of component (A).

The coating compositions prepared by the process of this invention may contain additional substances. Examples of such additives are fungicides, bactericides, flow-control agents, plasticizers, thickeners and matting agents. The additives are preferably mixed into the coating compositions after the mixture of components (A) to (D) have been reacted.

The coating compositions prepared by the process of this invention may also be modified by the addition of other polymers. Examples of such polymers are epoxy resins, alkyd resins, (meth)acrylates, polyesters, polyamides and polyurethanes.

Coating Composition Solutions

The coating compositions prepared as solutions in the process of this invention may have solids contents of up to 90% by weight. In general, they can easily be adjusted to solids contents of up to 80% by weight. Preferred solvents or solvent mixtures present in the solutions are those having a boiling point or boiling range of up to 200° C. at 0.1 MPa. Examples of such solvents are alcohols, such as methanol, ethanol, n-propanol and isopropanol; ethers, such as dioxane, tetrahydrofuran, diethyl ether and diethylene glycol dimethyl ether; chlorinated hydrocarbons, such as dichloromethane, trichloromethane, tetrachloromethane, 1,2-dichloroethane and trichloroethylene; hydrocarbons, such as pentane, n-hexane, hexane isomer mixtures, heptane, octane, ligroin, petroleum ether, benzene, toluene and xylenes; ketones, such as acetone, methyl ethyl ketone, methyl isobutyl ketone and cyclohexanone; carbon disulfide and nitrobenzene, or mixtures of these solvents.

Preferred solvents are toluene, o-, m- and p-xylene and mixtures thereof.

The term solvent does not mean that all the reaction components must be soluble therein. The reaction can also be carried out in a suspension or emulsion of one or more reactants. The reaction can also be carried out in a solvent mixture having a miscibility gap, in which case at least one reactant is soluble in each of the mixture phases.

Both before and after the reaction of the mixture of components (A) to (D), the solutions preferably contain from 5 to 1000% by weight, and in particular from 10 to 500% by weight, of solvent, based on the weight of components (A).

All or some of the solvents can be added before or after the reaction of the mixture of components (A) to (D). The solutions can be prepared by mixing the components in any desired sequence. Should the solutions contain a silicone resin, preferably of formula (1), as such or as part of components (A), these solutions can also be prepared by mixing silane or silane mixtures of formula (2) or partial hydrolysates thereof with component (B) and the solvent, and condensing the silane, silane mixture or partial hydrolysate, preferably at an elevated temperature.

The condensation step is preferably followed by removal of some of the solvent from the reaction mixture. This is preferably accomplished by distillation. At the same time, any alkanol and water formed as a condensation product are also distilled off. In this manner, a coating composition which has a long shelf life and can also be converted into a stable emulsion or dispersion is obtained. If a basic condensation catalyst as a constituent of component (B) is temperature-labile and if the decomposition or removal of this condensation catalyst is not desired, the mixture to be condensed should only be warmed slightly and should only be distilled under reduced pressure.

The molecular weight of the condensation product present in the coating composition prepared according to the invention is increased in the reaction of components (A) to (D) by a low content of the solvents or by increased removal by distillation toward the end of the reaction.

If the coating compositions prepared according to this invention are to dry or cure within a short time at room temperature to form tack-free films, more condensation catalyst must be present if the molecular weight of the condensation product present in the coating composition is low than if it is high.

In a preferred embodiment of the reaction of the mixture of components (A) to (D), high-molecular-weight and highly concentrated resin solutions are prepared by using a small amount of solvent or by substantially removing the solvent by distillation near the end of the reaction. The temperature is increased greatly, preferably to at least 150° C, preferably under reduced pressure, near the end of the reaction, during which the catalyst is fully or partially deactivated or removed by distillation. The coating compositions do not gel under these condition. They are now only weakly alkaline, preferably having an alkalinity corresponding to a maximum of 100 ppm, and in particular a maximum of 50 ppm, of potassium hydroxide, and have a high solids content of up to 90% by weight, and may also be essentially free from solvent. These coating compositions, which have a very long shelf life, can be converted into shear-stable emulsions or diluted as desired with solvents without impairing their shelf life, and dry in a short period of time at room temperature to form a tack-free film. Coating compositions having a low alkalinity are desired for many applications.

Coating Composition Emulsions

The emulsions which can be prepared in the process of this invention are, in particular, aqueous emulsions, i.e., emulsions containing water as the continuous phase (O/W emulsion). They preferably contain water in amounts of from 10 to 5000% by weight, and more preferably from 20 to 500% by weight, based on the weight of component (A).

In addition to the above mentioned components, the emulsions preferably contain at least one emulsifier. Particularly suitable anionic emulsifiers are:

1. Alkyl sulfates, preferably those having a chain length of from 8 to 18 carbon atoms and alkyl ether sulfates having from 8 to 18 carbon atoms in the hydrophobic radical and containing from 1 to 40 ethylene oxide (EO) or propylene oxide (PO) units.
2. Sulfonates, preferably alkyl sulfonates having 8 to 18 carbon atoms, alkylaryl sulfonates having from 8 to 18 carbon atoms, taurides, esters and monoesters of sulfosuccinic acid with monohydric alcohols or alkylphenols having from 4 to 15 carbon atoms, optionally, these alcohols or alkylphenols may also be ethoxylated with from 1 to 40 EO units.
3. Alkali metal and ammonium salts of carboxylic acids having from 8 to 20 carbon atoms in the alkyl, aryl, alkaryl or aralkyl radical.
4. Partial esters of phosphoric acid and alkali metal and ammonium salts thereof, preferably alkyl and alkaryl phosphates having from 8 to 20 carbon atoms in the organic radical, alkyl ether phosphates and alkaryl ether phosphates having from 8 to 20 carbon atoms in the alkyl or alkaryl radical and containing from 1 to 40 EO units.

Examples of nonionic emulsifiers which may be employed are:

5. Alkyl polyglycol ethers, preferably those containing from 8 to 40 EO units and containing alkyl radicals having from 8 to 20 carbon atoms.
6. Alkylaryl polyglycol ethers, preferably those containing from 8 to 40 EO units and having from 8 to 20 carbon atoms in the alkyl and aryl radicals.
7. Ethylene oxide/propylene oxide (EO/PO) block copolymers, preferably those containing from 8 to 40 EO or PO units.
8. Fatty acids having from 6 to 24 carbon atoms.
9. Natural products and derivatives thereof, such as lecithin, lanolin, saponins and cellulose; cellulose alkyl ethers and carboxyalkylcelluloses whose alkyl groups each have up to 4 carbon atoms.
10. Linear organo(poly)siloxanes containing polar groups, in particular those containing alkoxy groups having up to 24 carbon atoms and/or containing up to 40 EO and/or PO groups.

Cationic emulsifiers which may be employed are:
11. Salts of primary, secondary and tertiary fatty amines having 8 to 24 carbon atoms with acetic acid, sulfuric acid, hydrochloric acid and phosphoric acids.
12. Quaternary alkyl- and alkylbenzeneammonium salts, in particular those whose alkyl group has from 6 to 24 carbon atoms, and in particular the halides, sulfates, phosphates and acetates.
13. Alkylpyridinium, alkylimidazolinium and alkyloxazolinium salts, preferably those whose alkyl chain has up to 18 carbon atoms, in particular the halides, sulfates, phosphates and acetates.

Preferred emulsifiers are nonionic emulsifiers, and in particular those mentioned in paragraphs 5 to 7 above.

The emulsions prepared according to the invention preferably contain emulsifiers in amounts of from 0.5 to 15% by weight, and in particular from 1 to 6% by weight, based on the weight of component (A).

The emulsions prepared according to this invention can be prepared by any process by which silicone emulsions have been or could have been prepared heretofore. They are preferably prepared by one of the processes described below:

Process 1:
The emulsifier or emulsifier mixture is dispersed in component (A), then a little water is added with stirring, to form a very viscous concentrate, which is subsequently diluted with water to the desired solids content, and finally component (B) is added.

In contrast to processes 2 and 3, process 1 is also highly suitable for emulsifying component (A) having the formula (1) and/or (2), which contains exclusively methyl groups as radicals R. It is preferred for processes 2 and 3 below that component (A) contains other radicals, in addition to methyl radicals, if appropriate, as radicals R, such as for example phenyl radicals, since component (A) otherwise tends to gel under certain conditions.

Process 2:
Silicone resins of formula (1) and/or silanes or silane mixtures of formula (2) or partial hydrolysates thereof can, if they have a high content of Si-bonded phenyl groups and of alkoxy groups, be condensed in the absence of a solvent, if desired in the presence of a small amount of water, in the presence of component (B), and, after the addition of emulsifier and a little water, dispersed to form a viscous concentrate, which can subsequently be adjusted to the desired content using water.

After the condensation and before the addition of emulsifier, any alkanol formed and any water present can be removed by distillation if desired.

Process 3:
Emulsions can be prepared from the solutions prepared in the process of this invention, i.e., the products obtained from the reaction of components (A) to (D) (silicone resin solutions) using water and in the presence of an emulsifier. These solutions still contain organic solvent or a mixture of organic solvents. The emulsifier or emulsifier mixture is preferably dispersed in the silicone resin solution, analogously to process 1 described above, then a little water is added with stirring, giving a very viscous concentrate, which is subsequently diluted to the desired solids content using water.

In this process, silicone resin solutions having a high solids content are preferably employed so the organic solvent content in the emulsion is low; the silicone resin solution employed preferably contains at least 50% by weight, preferably at least 70% by weight, and more preferably at least 80% by weight, of solids, based on the total weight of the solution.

The emulsions prepared by processes 1 to 3 above preferably contain a maximum of 15% by weight, and more preferably a maximum of 5% by weight, of organic solvents. The emulsions preferably contain a maximum of 5% by weight of organic solvents, and they are especially free of aromatic solvents.

The coating composition emulsions prepared according to this invention are extremely shear-stable and form tack-free films in a short period of time at room temperature on the respective substrate.

The coating compositions prepared according to this invention can be applied in any manner by which coating compositions have heretofore been applied to substrates, for example by dipping, spreading, spraying and doctor-coating.

During application of the coating compositions or subsequent thereto, the solvent(s), if present in the coating composition, is (are) evaporated or allowed to evaporate.

The solvent which may be present in the coating composition and is evaporated or allowed to evaporate is, in particular, an organic solvent or a mixture of such solvents, or water, if desired mixed with a small amount of organic solvents.

If, and this is preferred, component (B) or part of component (B) is a base which boils, sublimes or decomposes, losing its basic properties, at a temperature of up to 600° C. and a pressure of 0.1 MPa, the coating is subsequently treated at a temperature and pressure such that the base distills off, sublimes or decomposes. Treatment at elevated temperature is preferred.

Use:
The coating compositions which are prepared by the process of this invention can be applied to all substrates to which silicone-containing paints and coatings have been or could have been applied heretofore, These are, in particular, coatings on plastics, corrosion-protection finishes, such as on iron and steel parts, building-protection compositions and other compositions for waterproofing and binding inorganic and organic materials, such as inorganic and organic fibers, porous and smooth building materials and precursors thereof, such as cement, concrete, sand-lime brick, mortar, aerated concrete, klinker brick, natural rock, such as marble, granite and limestone. The coatings can also be applied to electrical and electronic components, whether as electrical insulation materials or for the protection of these parts against dirt, moisture or mechanical influences.

The coating compositions which are prepared by the process of this invention are preferably applied to surfaces of plastics, metals and alloys thereof. Due to their temperature stability, they are particularly suitable as oven and exhaust paints.

The coating compositions prepared by the process of the invention dry within a short period of time, even at room temperature, to form tack-free films.

The coating compositions, i.e., in particular the solutions, dispersions and emulsions, have a long shelf life at room temperature without significantly changing their properties.

In the examples below, unless otherwise specified,
(a) all amounts are by weight;
(b) all pressures are 0.10 MPa (abs.);
(c) all temperatures are 20° C.
(d) all viscosities are measured at 25° C.
(e) all flashpoints are determined in accordance with DIN (Deutsche Industrie-Norm) 53 213;
(f) resin A: a cohydrolysate of phenyltrichlorosilane (2 mol parts) and dimethyldichlorosilane (1 mol part) which contains Si—O—C—bonded methoxy and butoxy groups and has a viscosity of 120 $mm^2s^{-1}$ at 25° C.;
(g) mixture B: a mixture of 700 parts by weight of resin A with 20 parts by weight of methyltriethoxysilane;
(h) silane C: a mixture of 940 parts by weight of phenyltriethoxysilane and 429 parts by weight of dimethyldiethoxysilane;
(i) BTAH: benzyltrimethylammonium hydroxide, employed as a 40% by weight solution in methanol;
(j) BS 15: potassium salt of methylsilicic acid, employed as an aqueous solution having a solids content of 41.5% by weight and a KOH content of 19.6% by weight;
(k) Zn: zinc pigment commercially available from Stolberger Zincoli GmbH, D-5190 Stolberg, as Zn 615;
(l) Al: aluminum pigment commercially available from Eckart Werke, D-8510 Fürth, as Stapa 2;
(m) KOH: 5% by weight solution of potassium hydroxide in water;
(n) NaOH: 13.9% by weight solution of sodium hydroxide in water;
(o) emulsifier: isotridecyl alcohol (16) polyglycol ether.

EXAMPLES

I. Resin solutions

Examples 1 to 18

Various amounts of basic condensation catalyst and, if desired, in addition sufficient water to ensure sufficient hydrolysis of the alkoxy groups were added with stirring to a solution of resin A in xylene. The mixture was subsequently heated to reflux temperature, whereupon the mixture suddenly became clear. The solvents (methanol or ethanol, if desired water, butanol and xylene) were subsequently removed in part by distillation, the residue was filtered, and the solution was adjusted to the desired solids content using xylene. The distillation was carried out under reduced pressure (from 4 to 5 kPa) if BTAH was used as base, and at 0.10 MPa in the presence of other bases.

In Example 12, mixture B in the amount indicated in the table was substituted for resin A, and in Example 13 silane C in the amount stated in the table was substituted for resin A. In each case, 15 g of a resin solution prepared in accordance with Examples 1 to 8, 10 to 12 and 14 were pigmented with 5 g of Zn or 5 g of Al, and the mixture was stored for 2 weeks at 60° C. in a drying cabinet. During this storage time, the pigmented solutions did not gel. Moreover, their was no indication of hydrogen evolution.

Further data are given in Tables 1 and 2 below.

TABLE 1

| Ex. No. | Catalyst | Resin A | Amounts used in g Xylene | Catalyst | Water | Solids content in % | Yield in g | Alkalinity in ppm of KOH |
|---|---|---|---|---|---|---|---|---|
| 1 | BS 15 | 720 | 589 | 39.3 | — | 50 | 1275 | 6,000 |
| 2 | BS 15 | 720 | 589 | 65.5 | — | 50 | 1190 | 9,800 |
| 3 | BS 15 | 720 | 589 | 98.2 | — | 50 | 1200 | 14,300 |
| 4 | BS 15 | 720 | 589 | 130.9 | — | 50 | 1205 | 18,770 |
| 5 | BS 15 | 780 | 520 | 65 | — | 50 | 1222 | 9,100 |
| 6 | BS 15 | 910 | 390 | 65 | — | 50 | 1386 | 7,850 |
| 7 | KOH | 720 | 589 | 65.5 | — | 50 | 1115 | 8,440 |
| 8 | NaOH | 720 | 589 | 65 | — | 50 | 1107 | 7,440 |
| 9 | BTAH | 720 | 589 | 17.3 | 56 | 50 | — | 19,100 |
| 10 | BTAH | 720 | 589 | 25.9 | 28 | 50 | 1198 | 2,700 |
| 11 | BTAH | 720 | 589 | 34.6 | 28 | 50 | 1122 | 3,500 |
| 12 | BTAH | 720 Mixture B | 589 | 25.9 | 28 | 50 | 1170 | 2,800 |
| 13 | BTAH | 1369 Silane C | 589 | 25.9 | 200 | 50 | 1258 | 2,000 |
| 14 | BTAH | 720 | 480 | 26.0 | 28 | 65 | 852 | 3,330 |
| 15 | BTAH | 720 | 480 | 13.0 | 28 | 70 | — | 1,860 |
| | | | | | | 65 | — | 1,770 |
| 16 | BTAH | 720 | 480 | 6.5 | 28 | 70.8 | 740 | 840 |
| | | | | | | 65 | — | 790 |
| 17 | BTAH | 900 | 600 | 4.1 | 35 | 70 | 1041 | 420 |
| | | | | | | 65 | | 390 |
| 18 | BTAH | 900 | 600 | 2.0 | 35 | 75 | 926 | 219 |
| | | | | | | 70 | — | 200 |
| | | | | | | 65 | — | 179 |

TABLE 2

| Example No. | Viscosity in mm²/s after preparation | Viscosity in mm²/s after 1 week at room temperature | Appearance | Flash-point in °C. (DIN 53213) | Drying time[a] in min |
|---|---|---|---|---|---|
| 1 | 7.0 | — | clear | 29 | >2d |
| 2 | 8.8 | 9.6 | clear | 30 | 16 |
| 3 | 12.1 | 11.7 | clear | 30 | 10 |
| 4 | 16.9 | 16.8 | clear | 31 | 7 |
| 5 | 11.2 | 10.1 | clear | 29 | 11 |
| 6 | 18.8 | 9.9 | clear | 28 | 10 |
| 7 | 9.4 | 9.8 | clear | 30 | 12 |
| 8 | 16.6 | 15.1 | clear | 29 | 12 |
| 9 | — | — | clear | — | >3d |
| 10 | 11.0 | 8.8 | clear | 27 | 20 |
| 11 | 12.3 | 11.9 | clear | 28(28)[b] | 15 |
| 12 | 10.2 | 9.0 | clear | 27 | 12 |
| 13 | 20.5 | 7.2 | clear | 28(27)[b] | 30 |
| 14 | 167 | 135 | slightly cloudy | — | 6 |
| 15 | 458 | 596 | — | — | 6 |
|  | 82 | 81 | — | — | 7 |
| 16 | 397 | 423 | slightly cloudy | — | 9 |
|  | 66 | 58 | — | — | 10 |
| 17 | 112 | 108 | slightly cloudy | — | about 15[c] |
|  | 39 | — | — | — | about 15[c] |
| 18 | 369 | — | slightly cloudy | — | about 15[c] |
|  | 86 | 74 | — | — | about 15[c] |
|  | 33 | — | — | — | about 15[c] |

[a] Films applied to iron sheeting using a 60 μm doctor
[b] Repetition of the measurement after storage (3 weeks at room temperature)
[c] Films still very slightly tacky One sample of each of the solutions stored for one week at room temperature in accordance with the data in these tables were stored for a total of three months at room temperature. None of these samples exhibited any significant change in viscosity between storage for one week and for three months.

Example 19

About 27 g of BTAH and 10 g of water were added to 900 g of resin A. The mixture was then warmed to 60°–65° C. After about 15 minutes, the reaction mixture became completely clear. The alcohol formed was not removed by distillation. The product had a viscosity of 1050 mm²s⁻¹ and a basicity corresponding to 3680 ppm of potassium hydroxide. The viscosity of the product was stable over a period of time. A film applied in a thin coating cured in about 5 hours to become tack-free.

Example 20

About 35 g of water and 4.6 g of BTAH were added to a mixture containing 900 g of resin A and 300 g of xylene. The mixture was then refluxed for 1 hour, during which it suddenly became clear. About 281 g of volatile constituents were subsequently removed by distillation at atmospheric pressure. The temperature of the reaction mixture rose to 157° C. during this operation. Under these condition, the catalyst was deactivated. The resultant decomposition products (principally trimethylamine) were for the most part removed from the system during this operation. The reaction mixture did not gel under these conditions.

After the reaction, butanol was added to form a resin solution having a solids content of 80% by weight. The resin solution then contained about 5% by weight of butanol and about 15% of xylene and had an alkalinity, determined as KOH, of 5 ppm and a viscosity of 1060 mm²/s. The viscosity of the resin solution was stable both at room temperature and after storage for two weeks at 60° C.

The resin solution dried after 10 minutes at room temperature on a substrate to form a tack-free film.

II. Resin Emulsions

Example 21

About 9 g of BTAH and 10 g of water were added to 900 g of resin A. The mixture was then warmed to 60°–65° C. After about 15 minutes, the reaction mixture became completely clear. A vacuum (about 200 mbar) was then applied, and about 33 g of alcohol were removed by distillation. The product had a viscosity of about 6500 mm²s⁻¹ and a basicity corresponding to about 1250 ppm of potassium hydroxide. The viscosity of the product is stable for a period of time. About 54 g of emulsifier and a little water were added to this product to give a concentrate, which was subsequently diluted to a solids content of 50% by weight by adding additional water. After storage for several days, the shear-stable emulsion prepared cured to form tack-free films.

Example 22

About 6% by weight, based on component (A) of emulsifier and a little water were added to a silicone resin solution, prepared in accordance with Example 18, having a solids content (proportion by weight of the total amount by weight of component (A) and component (B) of 75% to form a concentrate, which was subsequently adjusted to the desired solids content of 50% by weight using additional water. The resultant, extremely shear-stable emulsion dried in a short period of time, without further storage, after application to a substrate to form a tack-free film.

Example 23

An emulsion having a solids content of 50% by weight was prepared in accordance with Example 22 from the silicone resin solution prepared in accordance with Example 20. The emulsion was extremely shear-stable and dried after 10 minutes to form a tack-free film.

What is claimed is:

1. A process for preparing a coating composition which comprises condensing at an elevated temperature a mixture containing component (A) selected from the group consisting of
(1) a silicone resin of the formula $$R_x(OR')_y SiO_{(4-x-y)/2} \qquad (1)$$

in which R is a $C_1$- to $C_{18}$-hydrocarbon radical selected from the group consisting of alkyl radicals, cycloalkyl radicals, aryl radicals, alkaryl radicals and aralkyl radicals, R' is selected from the group consisting of $C_1$- to $C_4$-alkyl radicals and hydrogen atoms, x has an average value of from 1.1 to 1.9, y has a value of from 0.1 to 1.8 and the sum of x+y has a maximum value of 2.5,
(2) a silane of the formula $$R_a Si(OR')_{4-a} \qquad (2)$$

in which R and R' are the same as above, and a has an average value of from 1.1 to 1.9, and (3) mixtures thereof, in which a portion of component (A) is a silane of formula (2) and at least 30% of the radicals R in component (A) are phenyl radicals and/or tolyl radicals, in the presence of a basic condensation catalyst (B) selected from the group consisting of (1) tetra($C_1$- to $C_{12}$-hydrocarbon)-ammonium hydroxide, (2) tetra ($C_1$- to $C_{12}$-hydrocarbon)phosphonium hydroxide, (3) a silanolate of tetra ($C_1$- to $C_{12}$hydrocarbon)ammonium hydroxide, (4) a silanolate of tetra($C_1$- to $C_{12}$-hydrocarbon) phosphonium hydroxide and (5) mixtures thereof in an amount sufficient to render the resultant mixture basis, with the proviso that the silanol content of the mixture is at least 0.3% by weight based on the weight of component (A) and when the silanol content of the mixture is less than 0.3% by weight based on the weight of component (A) then sufficient water (C) is added so that a silanol content of at least 0.3% by weight based on the weight of component (A) is obtained and an organic solvent (D), removing the resultant alkanol formed during the condensation, in which said resultant coating composition is free from carboxylic acids and salts thereof.

2. The process of claim 1, in which the mixture is present as a solution, emulsion or dispersion.

3. The process of claim 1, in which at least some of the catalyst in the mixture is decomposed near the end of the reaction.

4. The process of claim 1, in which at least one pigment selected from the group consisting of zinc, aluminum, iron oxide and carbon black is added to the mixture after the reaction.

5. The process of claim 1, wherein the condensed mixture is formed into an emulsion or dispersion.

* * * * *